United States Patent [19]

Senften

[11] 4,250,982

[45] Feb. 17, 1981

[54] SECTION INSULATOR FOR CATENARY SYSTEMS

[75] Inventor: John W. Senften, Sun City West, Ariz.

[73] Assignee: Harvey Hubbell, Incorporated, Orange, Conn.

[21] Appl. No.: 69,617

[22] Filed: Aug. 27, 1979

Related U.S. Application Data

[63] Continuation-in-part of Ser. No. 869,036, Jan. 13, 1978, Pat. No. 4,187,934.

[51] Int. Cl.³ .............................................. B60M 1/18
[52] U.S. Cl. ......................................... 191/39; 191/41
[58] Field of Search ................... 191/15, 8, 39, 40, 41, 191/42, 43, 44, 44.1

[56] References Cited

U.S. PATENT DOCUMENTS

| | | | |
|---|---|---|---|
| 1,357,332 | 11/1920 | McDonald | 191/44 |
| 4,029,182 | 6/1977 | Proud | 191/39 |
| 4,187,934 | 2/1980 | Senften | 191/39 |

Primary Examiner—Richard A. Schacher
Attorney, Agent, or Firm—Pearne, Gordon, Sessions, McCoy & Granger

[57] ABSTRACT

A section insulator for insulating adjacent sections of contact wire of overhead power supply systems for electrified railway lines and the like is disclosed. The section insulator is interposed between separated ends of adjacent sections of contact wire. Rigid strain plates are secured to the opposed ends of the sections and a strain insulator is secured to the strain plates above the level of the contact wires to maintain the required tension in the contact wires. Spaced runners supported by the strain insulator extend between the contact wires, there being air gaps between the ends of the contact wires and the runners. A pair of diverging glider arms is secured to each contact wire section adjacent its end. The glider arms extend toward each other beyond the ends of the contact wire sections and overlap the ends of the runners, there being transverse air gaps between the diverging glider arms and the runners. The section insulator thus provides a smooth underrun from one section of contact wire around the diverging glider arms to the runners, then to the other pair of diverging glider arms and to the other section of contact wire. The insulator is supported by means of members extending vertically upwardly from the strain plates to a messenger wire. The section insulators disclosed herein are particularly adapted for use in compound catenary systems and may be adapted for use as phase breaks for alternating current systems.

11 Claims, 9 Drawing Figures

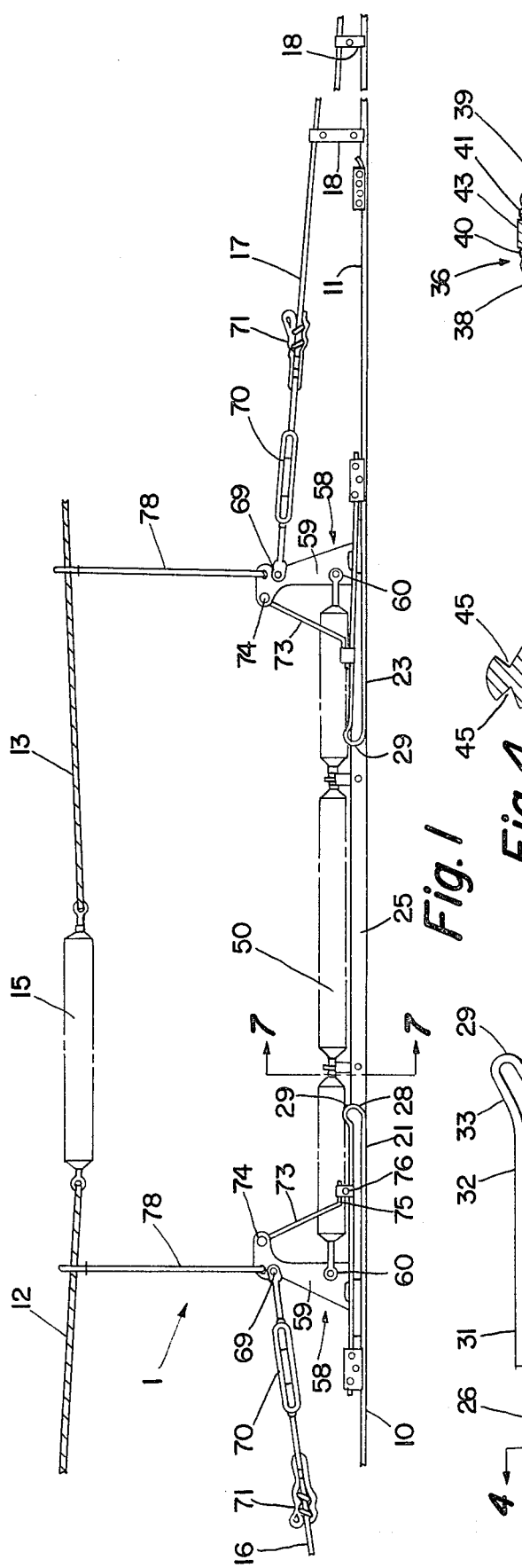
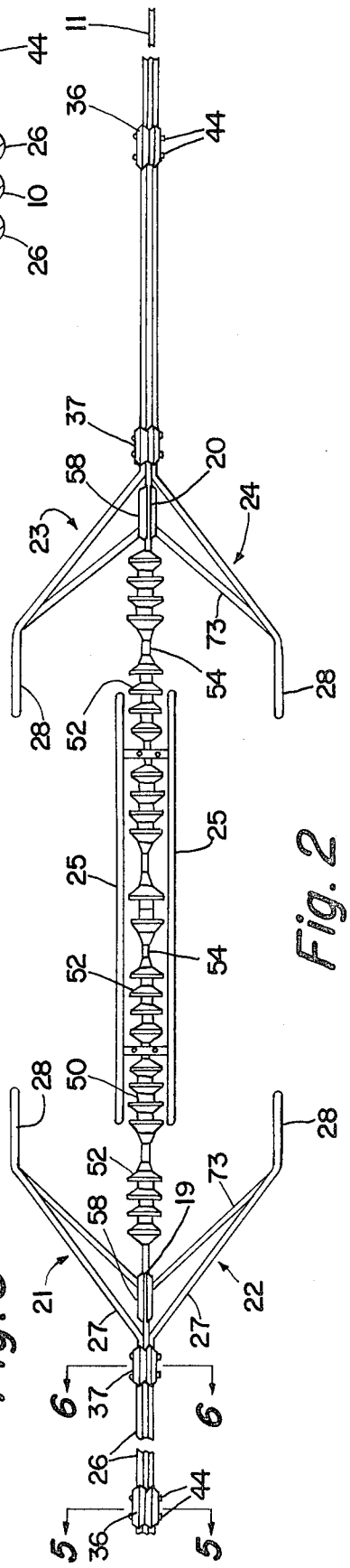

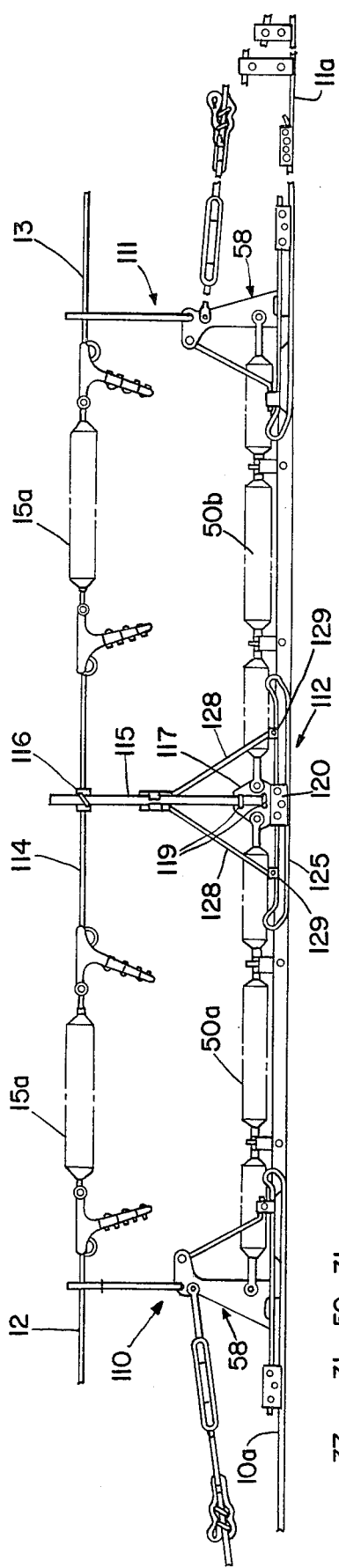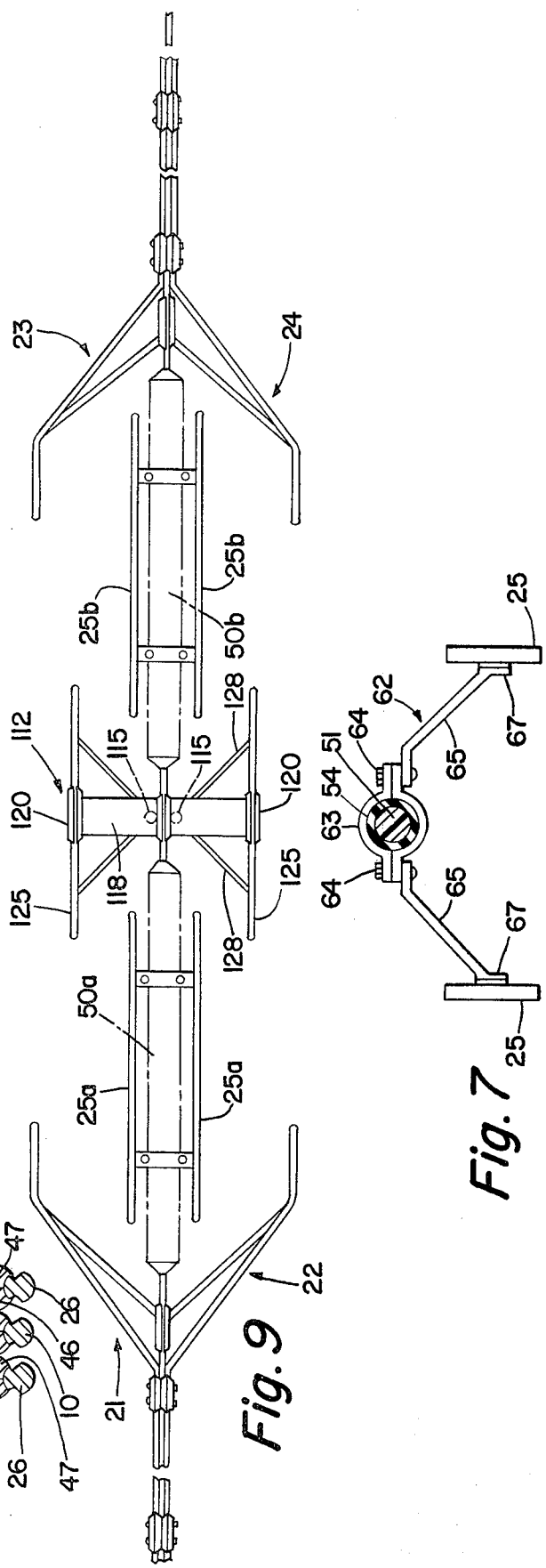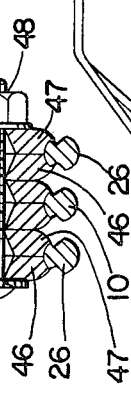

SECTION INSULATOR FOR CATENARY SYSTEMS

This is a continuation-in-part of application Ser. No. 869,036, filed Jan. 13, 1978, now U.S. Pat. No. 4,187,934, issued Feb. 12, 1980.

FIELD OF THE INVENTION

This invention relates to section insulators for the overhead trolley or contact wires of electric railway systems, and more particularly to section insulators for contact wires that are adapted for use with current collectors of the pantograph type. The section insulators are adapted for use in compound catenary systems in which the contact wires are suspended from auxiliary messenger wires by conventional hangers spaced at equal intervals along the auxiliary messenger and contact wires, the length of the hangers being such that the contact wires are suspended at a substantially constant distance above the tracks, and the auxiliary messenger wires in turn being supported by conventional hangers from the main messenger wires. Section insulators of the same general type adapted for use with simple, rather than compound, catenary systems, and adapted for use with direct suspension systems are disclosed and claimed in my parent application aforesaid, to which reference is hereby made.

BACKGROUND OF THE INVENTION

In electric railway systems, it is usual practice to interpose insulators at predetermined intervals between sections of the contact wire. The sections are ordinarily supplied with electric power by a feeder system extending along the track and the section insulators isolate the sections from each other and make it possible to de-energize sections as desired for maintenance or repair work.

Section insulators are also required in alternating current systems where the contact wires are supplied from the conductors of a three-phase system extending along the track, one phase being connected to one section of the contact wire, another phase to a succeeding section of the contact wire, and a third phase to still another section of the contact wire. This is done to balance the load on the three phases of the power supply, and it is essential that each section of contact wire be insulated from adjacent sections that are energized by different phases of the power supply system. The section insulators for accomplishing this purpose are called "phase breaks" in the industry.

In both ordinary section insulators and phase breaks, it is essential not only that adjacent sections of contact wire be electrically insulated from each other, but also that mechanical connections between the sections be provided to maintain the proper tension in the adjacent sections of contact wire. Also, the contact wires in adjacent sections must be supported at uniform levels, and the arrangement must be such that the current collectors on the trains, such as the contact bars of the pantographs, will ride smoothly and without instability from one contact wire across the section insulator or phase break to the next contact wire without undue sparking taking place and without the imposition of undue shocks or excessive mechanical forces on the pantographs, the contact wires, or the intermediate portions of the section insulators.

It has been proposed, as in British Pat. No. 18255 of 1906, to employ forked members connected to the opposed ends of adjacent sections of the contact wires, the members having arms which are disposed on either side of an intermediate piece having a surface of insulating material that is engaged by the collector element during its passage from one forked member to another. This system provides air gaps between the arms of the forked terminal members and the intermediate piece. The construction disclosed, however, embodies heavy, rigid parts that would be expensive to construct and install, and severe shocks would be imposed not only on the pantograph and associated elements, but also on the section insulator itself, if used in high speed service. It has also been proposed to employ a forked glider element attached to one section of the contact wire and leading to a pair of spaced runners separated by transverse air gaps on the arms of the glider and carrying the pantograph or other contactor to the contact wire of the next section, vertical members connected by strain insulators and supported from an overhead structure being employed to maintain tension in the contact wire sections.

SUMMARY OF THE INVENTION

A general object of the present invention is the provision of an improved section insulator for the contact wires of overhead power systems of the compound catenary type of electric railways and the like.

Another object is the provision of such a system that can be manufactured and installed at relatively low cost as compared to present systems.

Another object is the provision of such an insulator in which the parts that contact the current collectors of the vehicle being supplied with power are of such weight and flexibility that neither the current collectors of the vehicle nor the section insulators themselves are subject to undue shocks when the collectors engage the section insulators, even though the vehicles may be operated at high speeds.

A further object is the provision of such section insulators that can be constructed to act as phase breaks for systems in which a three-phase alternating current supply system is employed.

According to a preferred form of the invention, these and other objects of the invention are obtained by the provision of an insulator assembly for mounting between adjacent ends of two contact wires. The assembly comprises a forked glider made up of a pair of glider arms attached to each of said ends, the glider arms having lower surfaces lying in the same plane as the contact wire at the point of attachment of the gliders thereto. The glider arms extend laterally outwardly from the line of the contact wires and the arms on the opposed ends of the contact wires extend toward each other beyond the ends of the respective contact wires. A pair of runners is mounted between the arms, the runners extending closer to the ends of the contact wires than the ends of the glider arms. The runners have surfaces lying in substantially the same plane as the pantograph-engaging surfaces of the contact wires and the glider arms, whereby substantially smooth, level surfaces extending from one contact wire and one pair of glider arms across the runners to another pair of glider arms and another contact wire are provided. This construction furnishes a smooth, level underrun for the pantographs. A strain insulator disposed above the level of the runners and above the level of and in the same vertical plane as the opposed contact wires is mechanically connected to the contact wires by a rigid member and is arranged to maintain the tension in the contact wires and to support the runners. The assembly is supported from a cable disposed above the contact wires, and means are provided for balancing the turning moment applied to the rigid member because of the offset axes of the strain insulator and the contact wires.

The gliders are preferably formed of the same kind of wire as the contact wires by bending into the desired shape. The runners may be composed of a convenient insulating material, such as fiber-reinforced plastic, and the strain insulators preferably are lightweight, small diameter, high strength insulators comprising a tension member composed of plastic-bonded fiber glass and provided with weathersheds composed of a track-resistant rubber or rubberlike material for providing increased leakage distance along the fiber glass tension member. Insulators of this type are disclosed and claimed in U.S. Pat. No. 3,898,372, issued Aug. 5, 1975, and owned by the assignee of the present application.

BRIEF DESCRIPTION OF THE DRAWINGS

In the drawings, which illustrate preferred forms of the invention:

FIG. 1 is a side elevational view of a section insulator according to the invention, and adapted for use with a compound catenary suspension system;

FIG. 2 is a view of the section insulator of FIG. 1, looking up from beneath;

FIG. 3 is a side elevation of a glider arm used in the section insulator;

FIG. 4 is a section to an enlarged scale, taken along line 4—4 of FIG. 3;

FIG. 5 is a section to an enlarged scale, taken along line 5—5 of FIG. 2 and illustrating a known type of clamp utilized in the assembly;

FIG. 6 is a section to an enlarged scale, taken along line 6—6 of FIG. 2 and illustrating another known type of clamp utilized in the assembly;

FIG. 7 is a section to an enlarged scale, taken along line 7—7 of FIG. 1;

FIG. 8 is a side elevational view of a phase break for a compound catenary suspension system made according to the invention; and FIG. 9 is a view of the phase break of FIG. 8, looking up from beneath.

DESCRIPTION OF THE PREFERRED EMBODIMENT

A section insulator adapted for a compound catenary overhead contact wire system is illustrated in FIGS. 1 and 2 of the drawings. The section insulator assembly illustrated in general at 1 is shown as interposed between two contact wire sections 10 and 11. The ultimate support for the contact wires and the phase break assembly is provided by main messenger wires 12 and 13 that are connected together by a strain insulator 15 secured to the opposed ends of the messenger wires 12 and 13 by conventional fittings. The strain insulator is preferably constructed in accordance with the aforesaid U.S. Pat. No. 3,898,372. The main messenger wires 12 and 13 support auxiliary messenger wires 16 and 17 by conventional hangers (not shown) and the contact wires 10 and 11 are supported from the auxiliary messenger wires 16 and 17 by conventional hangers 18, only a few of which are shown. In accordance with usual practice, the hangers that support the auxiliary messenger wires and the hangers that support the contact wires 10 and 11 from the auxiliary messenger wires are so designed that the contact wires are maintained at a substantially constant distance above the track with which they are associated throughout their length.

In order to provide insulation between the sections 10 and 11 of the contact wires, the ends 19 and 20, respectively, of the wires 10 and 11 are spaced a distance apart that is determined by the system voltage and also by the construction of the pantograph collector system of the vehicles using the railway. A smooth, level underrun to support the pantographs in their travel across the section insulator is provided by pairs of diverging glider arms 21 and 22 associated with the contact wire section 10 and arms 23 and 24 associated with contact wire section 11. Runners 25 provide a level underrun for the pantographs between the ends of the arms.

The glider arms are preferably all identical, except that the arms of each pair are of opposite hand so that they will diverge, as shown in FIG. 2. Each arm, as shown in FIGS. 1, 2, and 3, has an underrun made up of a straight portion 26, a diverging portion 27, and an end portion 28 that is parallel to the portion 26. The end portions 28 of opposed arms project toward each other and are disposed beyond the ends 19 and 20 of the contact wires 10 and 11 and overlap the ends of runners 25. The end portions 28 are tilted upwardly as shown in FIGS. 1 and 3, and the wire from which the gliders are formed, which is shown in cross section in FIG. 4 and is preferably identical with the contact wire, is doubled back on itself, as shown in FIGS. 1 and 3, providing upwardly extending, rounded ends 29 on each glider arm. Each arm has an upper reach composed of portions 31, 32, and 33 that are spaced above but are substantially parallel to the portions 26, 27, and 28, respectively, of each arm. When the contact wire and portions of the arms are clamped together as described below, the resulting glider arm assemblies have sufficient strength and rigidity to withstand the forces exerted on them by the contact wires of pantographs passing beneath them, and also are of light weight and have flexibility comparable to that of the contact wires themselves, so that shocks to both the pantograph and the suspension systems as the contact bars of the pantographs pass beneath the section insulators are minimized.

In order to secure the glider arms to the contact wires and to complete the glider assemblies, clamps 36 and 37 are employed. A cross section of clamp 36 is shown to an enlarged scale in FIG. 5. The clamp comprises two oppositely facing outer jaws 38 and 39, two intermediate jaws 40 and 41, and a spacer 43. The parts are clamped together and into secure engagement with the contact wires 10 or 11, as the case may be, and the portion 26 of the glider arms by transversely extending bolt and nut assemblies 44 spaced longitudinally along the clamp. The contact wire and the wire from which the gliders are formed is preferably of the grooved type as shown in FIG. 4, having longitudinally extending grooves 45, as shown, which are engaged by the outer jaws 38 and 39 and the intermediate jaws 40 and 41. Clamps of this type are well known. Other known types of clamps can be employed and, while grooved wire is preferred, wires of round or other cross sectional shapes may be employed with appropriate clamps adapted to the purpose. The clamp 36 firmly secures the contact wire 10 to the portions 26 of arms 21 and 22 and a similar clamp 36 is employed to secure the portions 26 of the glider arms 23 and 24 to the contact wire 11 at the opposite end of the section insulator assembly.

The clamp 37 (see FIG. 6) that supports the end portions 31 of the upper reaches of the glider arms is made up of three pairs of oppositely facing jaw members 46, 47 which are clamped together by nuts and bolts 48. The lower portions of the jaw members clamp the contact wire 10 and the portions 26 of the arms 21 and 22. The upper portions of the outer pairs of jaw members engage and clamp the upper end portions 31 of the arms 21 and 22. A short section 50 of wire is disposed in the upper portions of the central pair of clamping jaws for balancing purposes. A similar clamp 37 is utilized in connection with the arms 23 and 24 at the opposite side of the section insulator. The clamps 36 and 37 firmly secure the arms of the gliders to the contact wires and provide a smooth underrun for the pantographs with a smooth transition between the center contact wires and the glider arms. The clamping jaws of the clamps 36 and 37 are composed of alloys that are corrosion-resistant and have ample electric conductivity to meet the requirements.

In order to maintain the tension in the contact wires 10 and 11, as well as to support the runners 25, a strain insulator 50 is provided. Insulator 50, like insulator 15, is preferably constructed in accordance with U.S. Pat. No. 3,898,372, and comprises an elongated tension member in the form of a fiber glass rod 51 (see FIG. 7) to the ends of which appropriate connecting fittings are secured. The rod is enclosed in weathersheds 52 composed of track-resistant rubber or rubberlike insulating material. The weathersheds provide the required leakage distance between the ends of the insulator and also protect the rod from weather and sabotage. As indicated in the drawings, the weathersheds may be arranged in groups (see FIGS. 2 and 8) with sleeves 54 embracing the fiber glass rod between groups of weathersheds.

In order to connect the contact wires 10 and 11 to the insulator 50 and also to support the section insulator, strain plates 58 are employed. These strain plates, which may be malleable iron castings, are secured in a known manner to the end portions 19 and 20 of the contact wires in the manner illustrated with respect to the strain plate 55 in my parent application aforesaid. The ends 19 and 20 of the contact wires are secured to conventional tips of known construction, being generally similar to the tips disclosed in U.S. Pat. No. 2,013,355, issued Sept. 3, 1935. The upwardly projecting portion 59 of each strain plate is secured to the tip in the manner described with reference to the strain plate 55 in my parent application aforesaid. The body 59 of each strain plate is provided with an eye to which the clevice end of the insulator 50 can be connected, as shown at 60. It will be noted that the connections 60 are at a level such that the weathersheds 52 are disposed at a level well above the level of the running surfaces of the gliders 21 to 24 and the lower surfaces of the runners 25, so that there is no danger of the pantograph bars interfering with or striking the weathersheds. The strain insulator 51 is thus securely connected to the contact wires 10 and 11 through the strain plates 58 and the tips forming part of the strain plate, and function to maintain the required tension in the wires.

In order to support the runners 25 from the insulator 50, brackets 62, as illustrated in FIG. 7, are provided. These brackets are preferably identical, and each comprises a two-piece metal ring 63 that may be clamped on one of the rubber sleeves 54 surrounding the fiber glass rod 51 of the insulator between groups of weathersheds 52. The bolts 64 that clamp the two parts of the ring 63 together also secure depending supporting arms 65 to the rings. The supporting arms diverge, and the vertical end portions 67 thereof are bolted to the runners 25, supporting the runners with their lower surfaces at the same level as the underneath surfaces of the gliders.

As shown, the strain plates 58 extend a substantial distance above the connections 60 to the insulator 50. The strain plates are connected as at 69 to turnbuckles 70, which in turn are connected by appropriate clamps to the auxiliary messenger wires 16 and 17. Also, in order to adjust the level of the gliders, braces 73 are pivotally secured, as at 74, to the upper portions of the strain plates. These braces terminate in lower, horizontal portions 75, which are adjustably secured to the upper reaches of the glider arms, as by clamps 76. By changing the position of the clamps on the glider arms, the level of the arms can be adjusted as desired. The clamps 76 may be constructed in any convenient manner. For example, such clamp may comprise a pair of oppositely facing clamping jaws which, when assembled and clamped together as by a bolt, provide a horizontal clamping recess for engagement with the portion 32 of the glider arm with which it is associated and another horizontal clamping recess that is simultaneously clamped into engagement with the horizontal end portion 75 of one of the braces. It will be evident that with this arrangement, the clamps can be moved readily to desired positions of adjustment along the arms, this adjustment making it possible precisely to locate the glider arms at desired levels to ensure a smooth transfer of the pantographs from the glider arms to the runners 25.

The insulator 50 applies forces to the strain plates 58 in directions opposite to the forces applied to the strain plates by the contact wires, and the lines of action of the opposed forces exerted by the insulator and the contact wires impose turning moments on the strain plates 58. These moments are resisted by tension members preferably constituted by the auxiliary messenger wires 16 and 17, which, as noted above, are connected to the upper portions 59 of the strain plates 58 at a level well above the connections 60 between the insulator 50 and the strain plates. Turnbuckles 70, each connected to the adjacent auxiliary messenger wire by a conventional clamp 71, make possible adjustment of the tension in the messenger wires.

By this arrangement, the turning moments imposed on the strain plates are balanced by tension members such as the messenger wires. Accordingly, the strain plates and the section insulators can be supported by suspension members 78, which can simply be sections of steel cable or light-walled pipe, since these members are not subjected to any substantial bending forces.

The wide spacing of the glider arms 21–22 and 23–24 and the substantial transverse spacing between the runners 25 ensures that these parts will not be tilted or displaced substantially by the passage of pantographs beneath them. It is further to be noted that in the preferred form of insulator the rubber weathersheds can be of fairly small diameter, as compared to conventional porcelain insulators, the rubber weathersheds having a diameter of, for example, 5 or 6 inches in typical installations. Because of the small diameter, the runners 25 can be spaced apart a distance greater than the diameter of the weathersheds. This permits water dripping from the insulator 50 to fall directly through the space between the runners to the ground, rather than being deposited on the runners and then running off the runners to the ground. This arrangement reduces the likelihood of contamination of the runners. Thus, the invention provides the advantages of light weight, resilience, reasonable cost of manufacture and assembly, and protection afforded by the dual air gaps.

FIGS. 8 and 9 illustrate the invention as it may be applied to a phase break for alternating current systems in which a central grounded element is employed, thereby to prevent the possibility of any line-to-line short-circuiting taking place. The phase break of this system is interposed between the ends of contact wires 10a and 11a, and comprises end assemblies, indicated in general at 110 and 111. End assemblies 110 and 111 are identical in all material respects with the end assemblies of the section insulators of FIGS. 1 and 2 of the drawings, and the same reference characters have been applied to corresponding parts. However, when the invention is adapted to a phase break, an intermediate grounded assembly, indicated in general at 112, is interposed between the assemblies 110 and 111. The intermediate assembly 112 is supported by a central portion 114 of the messenger wire, which is insulated from the adjacent sections 12 and 13 of the messenger wire by insulators 15a. Portion 114 of the messenger wire may be suitably grounded.

The intermediate assembly 112 of the phase break is supported by downwardly extending pipe sections 115 which are secured by a conventional clamp 116 to the portion 114 of the messenger wire. These pipe sections are secured at their lower ends to a double strain plate 117 which is generally similar to strain plates previously described, except that it has oppositely disposed means for attachment to the insulators 50a and 50b of the assemblies 110 and 111. The insulators exert opposite, substantially equal forces on the strain plate 117. Also, the bottom end of the strain plate 117 is secured to a transversely extending plate 118, as by bolting, and the pipe sections 115 are secured to the double strain plate, as by clamping rings 119.

The plate 118 is appropriately secured to clamps 120, which support longitudinally extending, intermediate gliders 125. These gliders may be formed by bending an appropriate length of contact wire into the shape shown in FIG. 8, and the opposed ends of the upper reaches of the gliders are secured by the clamps 120. Diagonal braces 128 are adjustably clamped to pipe sections 115 and to the upper reaches of the gliders 125, as at 129, so that the level of the gliders 125 can be adjusted. The rigid pipe sections 115 support and stabilize the gliders.

In this form of the invention, the contact bars of the pantographs travel from one end assembly 110 over the gliders 20 and 21 thereof, to the runners 25a, which are supported in the manner previously described, from insulator 50a. As the pantographs approach the ends of the runners 25a, they reach the intermediate, longitudinally extending gliders 125, which may be grounded through the grounded portion 114 of the messenger wire. The pantographs then travel along the gliders 125 to the next set of runners 25b and then to the gliders 23 and 24 of the end assembly 111, and ultimately to the contact wire 11a. With this arrangement, there are separate air gaps between the end assemblies and the center grounded assembly, and strain insulators between these assemblies as well as pairs of transversely extending air gaps between the glider arms and the runners, and between the intermediate gliders 125 and the runners. Thus, the assembly provides a lightweight phase break with a smooth underrun in which the levels of the gliders and the runners can be adjusted accurately and in which the portions of the gliders that contact the pantographs have approximately the same degree of flexibility as the contact wires themselves, whereby shocks to the pantograph and the parts that are in contact with it are minimized. The presence of the four sets of lateral air gaps precludes line-to-ground or line-to-line short circuits, even though the runners should become so contaminated as to be conductive.

From the foregoing, it will be seen that the invention provides lightweight, efficient section insulators that are particularly adapted to systems with auxiliary messenger wires. The design of the section insulators is such as to take advantage of the qualities of lightness and strength, as well as compactness found in the preferred form of strain insulators. The lightness is important from the standpoint of the structure required to support section insulators and phase breaks, the ease of installation, and the reduction of shock that might otherwise be occasioned as the pantographs pass over the insulators and phase breaks.

Various changes and modifications can be made in the preferred forms of the invention disclosed herein without departing from the spirit and scope of the invention. The essential characteristics of the invention are defined in the appended claims.

What is claimed is:

1. A section insulator assembly for mounting between spaced aligned ends of two contact wires of an overhead power supply of an electrified transportation system, there being a supporting cable above said contact wires, said assembly comprising main strain insulator means extending between the ends of the two contact wires at a level above the level of the contact wires, rigid means secured to each contact wire and to the adjacent ends of the strain insulator means, the strain insulator means being secured to the rigid means at a level above the level of the contact wires, thereby to maintain tension in the contact wires, a runner disposed between the ends of the contact wires and supported by and disposed at a level lower than said strain insulator means, a tension member secured to each of said rigid means at a level above the level at which the strain insulator means is secured to said rigid means, said tension member extending from said rigid means in a direction opposite from said strain insulator means, whereby said tension members resist the turning moments imposed on the rigid means by reason of the offset between the axes of the contact wire and the strain insulator means, means extending downwardly from said supporting cable adjacent each end of said strain insulator means and secured to and supporting said rigid means, and a pair of glider arms mounted at the ends of the contact wires, the glider arms in each pair extending laterally outwardly from the adjacent contact wire and extending longitudinally to overlap the ends of said runner, there being lateral air gaps between said runner and said glider arms.

2. A section insulator assembly according to claim 1, wherein said rigid means comprises a strain plate secured to the end of each contact wire and extending upwardly therefrom, the ends of said strain insulator means being secured to said strain plates.

3. A section insulator assembly according to claim 2, wherein said means extending downwardly from said supporting cable are secured to said strain plates.

4. A section insulator assembly according to claim 2, wherein there are two transversely spaced runners supported by said strain insulator means.

5. A section insulator assembly according to claim 2, wherein said strain insulator means is provided with transversely extending weathersheds between the ends thereof.

6. A section insulator assembly according to claim 1 or claim 5, having braces extending from said rigid means to said glider arms, the positions of said braces being adjustable whereby the height of said glider arms can be adjusted.

7. A section insulator assembly according to claim 2, wherein said supporting cable comprises two sections of a main messenger wire, the sections being insulated from each other.

8. A section insulator assembly according to claim 2, wherein the main messenger wire supports two sections of an auxiliary messenger wire, each section being disposed directly above and supporting one of the contact wires, the ends of said sections of said auxiliary messenger wire also being secured to said strain plates whereby said sections of auxiliary messenger wire constitute the said tension members and resist the turning moments imposed on the strain plates by reason of the offset between the axes of the contact wires and the strain insulator means.

9. A section insulator according to claim 2, wherein said strain insulator means comprises a central tension member composed of fiber-reinforced plastic provided with metal end fittings, and weathersheds on said tension member composed of rubberlike material.

10. A section insulator assembly according to claim 2, having two pairs of aligned runners, the ends of said pairs of runners remote from the ends of said contact wires being spaced from each other, an intermediate pair of gliders bridging the longitudinal gap between said runners, there being transverse air gaps between said intermediate gliders and the runners in each pair, means for supporting said intermediate gliders from said supporting cable, said strain insulator means having a section extending from a point adjacent the end of one section of contact wire to said means for supporting said intermediate gliders and another section extending from said means for supporting said intermediate gliders to a point adjacent the other section of contact wire.

11. A section insulator assembly according to claim 10, wherein said means for supporting said intermediate glider comprises a rigid member extending downwardly from said supporting cable.

* * * * *